UNITED STATES PATENT OFFICE.

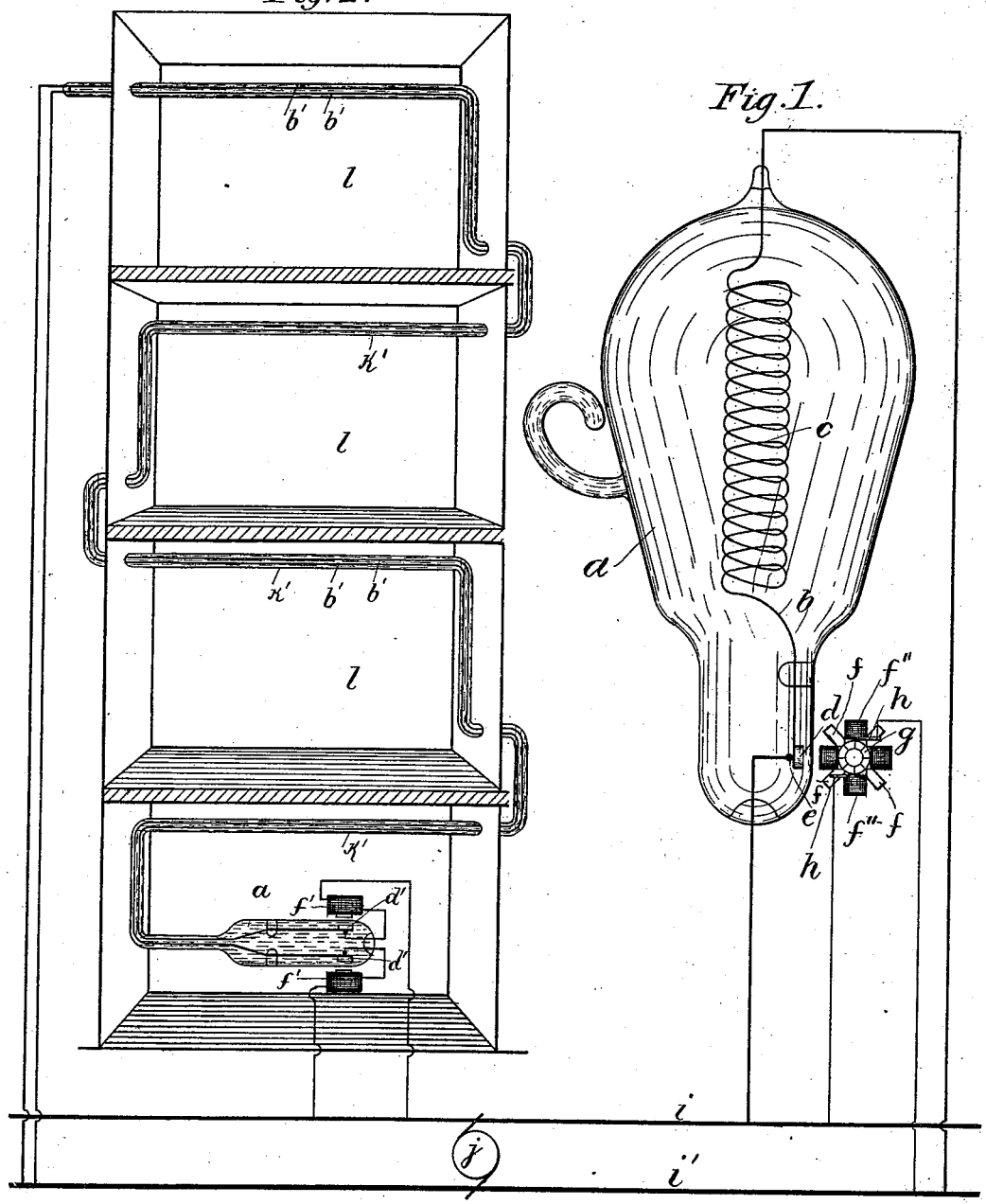

DANIEL McFARLAN MOORE, OF NEW YORK, N. Y.

METHOD OF ELECTRICAL ILLUMINATION.

SPECIFICATION forming part of Letters Patent No. 548,129, dated October 15, 1895.

Application filed December 4, 1894. Serial No. 530,785. (No model.)

*To all whom it may concern:*

Be it known that I, DANIEL MCFARLAN MOORE, a citizen of the United States, and a resident of New York city, county and State of New York, have invented certain new and useful Improvements in Methods of Electrical Illumination, of which the following is a specification.

My invention relates to certain steps which, taken together, effect a new method of producing artificial illumination.

I accomplish the luminosity of a rarefied atmosphere by means of a dynamic current as distinguished from static electricity. The light which is produced extends throughout the rarefied atmosphere which should exist in some hermetically-sealed inclosure.

For the purpose of illustrating how the method is put into practice the accompanying drawings are described by reference-letters.

Figure 1 is a view, partly in diagram, of an illuminator intended to radiate light from the rarefied atmosphere or vacuum of a bulb. Fig. 2 is a view, partly in diagram and partly in section, of means for showing the generation of luminosity throughout the conduit extending from a given station, for example, in the lower floor of a house to different stations—as, for example, to the different rooms of the building.

The organization represented in Fig. 1 consists of the combination of an evacuated bulb $a$, through which passes an electric conductor $b$, having numerous spiral convolutions $c$ and an armature $d$, forming an electric terminal elastically bearing against the conductor $b$, between which there are preferably platinum tips $e$ for purposes of better electrical contact, a multipolar rotary magnet $f$ outside of the bulb and within inductive action of the armature and caused to be rotary, for example, by means of a motor $f''$, attached thereto and identified, further, by the commutator or collector $g$ and brushes $h$, which are connected to the main lines $i\ i'$, extending from the generator $j$.

The normal condition of the apparatus is that in which the platinum tips $e$ are in contact and the current is turned on through the commutator $g$. The poles of the magnet $f$ rotate very rapidly, according to the energy applied to the same from the generator $j$, and every time that one of the poles is opposite the armature $d$ the latter is attracted and the current through the conductor $b$ is broken; but upon the departure of the same pole the armature returns and closes the circuit of the conductor $b$. The result, in brief, is a rapid interruption of the current traversing the vacuum along the electric conductor $b$. When this operation is effected, it will be noticed that the light is remarkably brighter adjacent to the coil $c$ than elsewhere, although it is true that the luminosity is distributed throughout the whole bulb and extends even into the branch tube extending from the bulb, the same being represented at the letter $k$. The current which will operate this may be any kind; but it should be noticed that the ordinary commercial electric-lighting current of a few hundred or thousand or less volts will operate the device, which may consequently be applied to any of the electric-lighting circuits now found in use in almost any city. As to the comparative preference of the direct or alternating current, it may be stated that if the conditions are the same there is not very much difference more than to say that the alternating-current produces somewhat better results than a continuous-current generator. It appears, also, from experiments that the length of the sparks produced by the interruptions within the vacuum is proportional to the luminosity in the sense that the greater the length the greater the luminosity. As to positive and negative terminals, it is found that for best effects the conductor $b$, which passes from one end of the bulb to the other, should be the negative with direct currents.

In Fig. 2 there is a bulb $a$, as before, having duplicate armatures $d'$ within inductive action of external magnets $f'$, which are arranged as in my former patents relating to electric vibrators—that is, in circuit with the electric elastic terminals within the vacuum—involving the principle that when the armature is attracted the current is broken. This causes the demagnetization of the magnet, so that the current becomes again closed when the magnet again attracts the armature and the operation is repeated, whereby the negative conductors $b'$, extending through the conduit $k'$, extending through the rooms $l$ of the building, are surrounded by phosphorescence. The magnets $f'$ are purposely arranged in parallel, so that the interruptions will take place indiscriminately, thereby producing a uniformity of luminosity in the conduit. It is found that when one is used accidental causes, such as vibrations of the armature-support, will cause a little fluctuation, but by having several the combined result is steadiness of light in the same manner that several candles produce a constant light while one will cause flickering.

I claim as my invention—

1. The hereinbefore described method of producing a Geissler tube effect, consisting in producing light throughout a vacuum traversed by an electric current, by intermittently interrupting, in the vacuum, the current and producing and maintaining the atmosphere of the vacuum sufficiently rare to effect an apparent continuous generation of light at all points of the atmosphere within the inclosure.

2. The hereinbefore described method of producing a Geissler tube effect, consisting in producing light throughout a vacuum traversed by a dynamic current as distinguished from static electricity, by automatically intermittently interrupting, in the vacuum, the current and producing and maintaining the atmosphere of the vacuum sufficiently rare to effect an apparent continuous generation of light at all points of the atmosphere within the inclosure.

3. The hereinbefore described method of producing a Geissler tube effect, consisting in producing light throughout a vacuum traversed by a dynamic current of negative polarity, by interrupting the current at points within the vacuum and producing and maintaining the atmosphere of the vacuum sufficiently rare to effect an apparent continuous generation of light at all points of the atmosphere within the inclosure.

4. The hereinbefore described method of producing a Geissler tube effect, consisting in producing light within a vacuum traversed by an electric current, by interrupting the current at points within the vacuum and augmenting the light at certain locations within the vacuum by increasing the induction of the current upon itself at said locations.

5. The hereinbefore described method of producing a Geissler tube effect, consisting in producing light throughout a rarefied atmosphere surrounding an electric conductor and located at a given station and transmitting the light to different sub-stations by continuing thereto the rarefied atmosphere and by rapidly interrupting the conductor at points within the said atmosphere and producing and maintaining the atmosphere of the vacuum sufficiently rare to effect an apparent continuous generation of light at all points of the atmosphere within the inclosure.

6. The hereinbefore described method of producing a Geissler tube effect, consisting in producing such a molecular disturbance as to produce light by intermittently interrupting the current within the atmosphere and conveying the light to distant points through the conduit by rarefying the atmosphere to a predetermined amount within the conduit and producing and maintaining the atmosphere of the vacuum sufficiently rare to effect an apparent continuous generation of light at all points of the atmosphere within the inclosure.

7. The hereinbefore described method of producing a Geissler tube effect, consisting in producing a luminous molecular disturbance by causing an interruption of a continuous dynamic electric current at points within a rarefied atmosphere and producing and maintaining the atmosphere of the vacuum sufficiently rare to effect an apparent continuous generation of light at all points of the atmosphere within the inclosure.

8. A phosphorescent illuminator consisting of the combination with an evacuated inclosure, of an electric conductor passing through the same, vibratory contacts included in a given circuit with the conductor within the inclosure and provided with an armature, and a magnet in a different circuit within inductive action of the armature, and means for moving the poles of the magnet toward and from the said armature.

9. A phosphorescent illuminator consisting of the combination with an evacuated inclosure, of an electric conductor passing through the same, vibratory contacts included in circuit with the conductor within the inclosure and provided with an armature, a magnet within inductive action of the armature and located outside of the inclosure and means for rotating the magnet at or near the armature.

10. A phosphorescent illuminator consisting of an evacuated inclosure, electrical conductors extending through the same and provided respectively at points in the inclosure with pairs of separable contacts, and means for producing non-synchronous vibration of the pairs of contacts.

11. The combination with an evacuated inclosure of vibratory electric terminals and a coil of wire included in circuit with one of the terminals and within the inclosure, the wire being so coiled that the electric field of force surrounding the wire of a given portion of the coil intersects the field surrounding another portion of the same wire.

In testimony that I claim the foregoing as my invention I have signed my name, in presence of two witnesses, this 1st day of December, 1894.

D. McFARLAN MOORE. [L. S.]

Witnesses:
EDWARD P. THOMPSON. [L. S.]
ROBERT S. CHAPPELL. [L. S.]